(12) United States Patent
Dieker

(10) Patent No.: US 11,338,226 B2
(45) Date of Patent: May 24, 2022

(54) FILTER PIPE FITTING

(71) Applicant: IRRITEC USA, INC., Fresno, CA (US)

(72) Inventor: Kevin Dieker, Fresno, CA (US)

(73) Assignee: IRRITEC USA, INC., Fresno, CA (US)

( * ) Notice: Subject to any disclaimer, the term of this patent is extended or adjusted under 35 U.S.C. 154(b) by 0 days.

(21) Appl. No.: 16/773,628

(22) Filed: Jan. 27, 2020

(65) Prior Publication Data

US 2020/0246730 A1 Aug. 6, 2020

Related U.S. Application Data

(60) Provisional application No. 62/799,579, filed on Jan. 31, 2019.

(51) Int. Cl.
*B01D 35/34* (2006.01)
*B01D 24/46* (2006.01)
*B01D 29/13* (2006.01)
*C22B 3/22* (2006.01)
*B01D 35/02* (2006.01)

(52) U.S. Cl.
CPC .............. *B01D 29/13* (2013.01); *B01D 35/02* (2013.01); *C22B 3/22* (2013.01); *B01D 2201/4092* (2013.01)

(58) Field of Classification Search
CPC ............... B01D 29/13; B01D 35/02; B01D 2201/4092; B01D 29/52; B01D 29/33; C22B 3/23; F16L 33/24; F16L 33/223; F16L 35/00; F16L 37/05; F16L 15/003
See application file for complete search history.

(56) References Cited

U.S. PATENT DOCUMENTS

| | | | | |
|---|---|---|---|---|
| 2,905,327 A | * | 9/1959 | Phillips | B01D 35/027 210/463 |
| 2,933,188 A | | 4/1960 | Jacula | |
| 5,360,239 A | | 11/1994 | Klementich | |
| 5,860,678 A | * | 1/1999 | Urzua | F16L 19/00 285/40 |
| 6,695,355 B1 | | 2/2004 | Giuffre | |
| 2006/0260995 A1 | * | 11/2006 | McCormick | B01D 29/23 210/232 |
| 2017/0029945 A1 | | 2/2017 | Kamakura | |
| 2017/0197165 A1 | * | 7/2017 | Schwartz | B01D 46/002 |
| 2019/0016211 A1 | | 1/2019 | Novak | |

* cited by examiner

*Primary Examiner* — Waqaas Ali
(74) *Attorney, Agent, or Firm* — David G. Duckworth

(57) ABSTRACT

A filter pipe fitting is provided for use in connecting a supply pipe to drip line tubing used within heap leach mining. The filter pipe fitting includes first and second ends. The pipe fitting's first end includes male threads for threadably affixing to female threads formed in the sidewall of a supply pipe. The pipe fitting's first end further includes a filter element preferably including longitudinally extending slats forming longitudinally extending slots. The filter element preferably has a closed end, which may or may not be disengageable from the slats. The pipe fitting's second end includes male threads for affixing to a ring nut. The second end further includes a male clamping surface for engaging a female clamping surface circumferentially found on the interior of the ring nut. The male and female clamping surfaces are utilized to clamp onto the tubular end of drip line tubing.

6 Claims, 6 Drawing Sheets

FILTER PIPE FITTING

RELATED APPLICATIONS

The present application claims benefit of U.S. Provisional Patent Application Ser. No. 62/799,579 filed on Jan. 31, 2019.

BACKGROUND OF THE INVENTION

The present application relates to heap leaching. More particularly, the present invention relates to pipe fittings utilized in the irrigation process to accomplish heap leaching.

Heap leaching is an industrial process used to extract gold, copper, nickel, uranium and other precious metals from ore. This process delivers viability to what would otherwise be regarded as waste or low-grade ores. Heap leaching is accomplished using a series of chemical reactions wherein the desired metals are separated from earth materials.

The process includes breaking and crushing the ore into small chunks and pieces. More recently, a rotating drum has been employed to break the ore into smaller and more uniform particles. The mined and processed ore is then placed on a liner, also referred to as a pad, which has a minimum thickness of 1.5 millimeters. The pads vary in design. Conventional pads are utilized for mostly flat terrain. Dump leach pads are utilized for less flat terrain, and Valley and Fills are pads are that can be utilized at the bottom of valleys. Once the mined ore has been placed upon the pad, the ore is irrigated with a leach solution. Leach solution percolates via capillary action through the heap and to the bottom of the liner. Typically, sulfuric acid is used to acquire copper from ore. Meanwhile, alkaline cyanide solutions are typically employed to acquire gold from ore. These leach solutions are also utilized to acquire nickel and uranium. A chemical dissolution reaction takes place, causing the target metal to be released from the earth material and dissolved into solution, now referred to as "pregnant" solution. Pregnant solution flows by gravity to holding ponds where it accumulates and is later conveyed to a processing plant for mineral recovery. Following this, the stripped solution is typically recirculated back to the top of the heap, creating a closed loop leaching cycle.

Though sprinklers are occasionally utilized to irrigate the ore, more recently drip irrigation is employed to more uniformly distribute the leach solution, and minimize evaporation and mineral damage. Drip irrigation employs at least one supply pipe to supply the leach solution of sulfuric acid or alkaline cyanide. The supply pipe then feeds this leach solution to a plurality of drip lines. Each of the drip lines are connected to the supply pipe by a pipe fitting. Typically, the supply pipe is made of polyvinylchloride or polyethylene plastic, and the drip line tubing is made of polyethylene plastic. The pipe fitting that connects the supply pipe to the drip line tubing is typically made of a composite plastic such as a combination of polypropylene and glass.

Unfortunately, the holes within the drip line tubing are prone to being clogged with dirt and debris that has found itself into the leaching solution. This is especially true in closed loop systems in which the leaching solution is being recirculated and may carry contaminants. This results in increased operating expenses and having to replace the drip lines much sooner than desired.

Thus, there is a need for a system or apparatus which would extend the life of the drip line tubing. Furthermore, there is a need for a system or apparatus that would remove or filter the dirt or debris from the leaching solution prior to the solution reaching the drip line holes.

There are a variety of filter systems, of course, such as that described in U.S. Pat. No. 2,933,188, which describes a filter for a gasoline tank. The reference describes a screen that inhibits material from clogging the filter and therefore, impeding gasoline flow. Filter apparatuses, such as this, are specially tailored for gasoline tanks or the like, and unfortunately, do not apply to drip irrigation systems. Similarly, U.S. Pat. No. 2,905,327 describes a filter unit specifically designed for fuel consuming instrumentalities. This reference describes a connector for connecting a fuel line to a fuel tank and, again, does not address a filtration system usable in heap leaching. Yet another filter system is described in U.S. Patent Publication No. 2006/0260995, this reference describes a filtered flow-through fitting, particularly for engine applications.

However, none of the above references described a connector for use with drip lines or a system wherein the connecter includes a filter which extends crossways to the flow path within a pipe. Therefore, it would be desirable to provide a pipe fitting which removed dirt and debris from the leaching solution.

SUMMARY OF THE INVENTION

The present invention addresses the aforementioned need by providing a filter pipe fitting that could be utilized to accomplish heap leaching. To this end, the pipe fitting is tubular shaped with a cylindrical sidewall, a central bore, and first and second ends. The first end is constructed to interlock with a supply pipe, while the second end is constructed to latch to a length of a drip line tubing. To this end, the first end's outer surface includes male threads that threadably affix to female threads formed in the supply pipe's sidewall. Preferably, the threads are in accordance with American National Standard Taper Pipe Thread ("NPT") and have a taper of 0.75 inch per foot.

Moreover, the first end includes a filter element. Preferably, the filter element's length is at least equal to or greater than the filter element's width. Even more preferably, the filter element's length is at least twice as great, or even more preferably, four times as great as the filter element's width. In the preferred embodiment, the filter element includes longitudinally extending slats forming longitudinally extending slots that are positioned within the interior of the supply pipe. Also, preferably, the filter element has a closed end that may be removable or formed integrally with the slats.

Additionally, the second end's outer surface includes a helically extending male thread. In the preferred embodiment, the male thread's distal end comprises a circular shoulder that functions as a stopper when connected to the end of the drip line pipe. Furthermore, the second end includes a tapered construction and a male clamping surface that joins with the female clamping surface circumferentially found on a ring nut's inner surface, which function to latch onto to the end of the drip line tubing.

In the preferred embodiment, the pipe fitting includes end-of-stroke flanges between its first and second ends. The flanges impede relative rotation between the pipe fitting assemblages that are affixed together. The entire assembly of this invention includes a supply pipe, drip lines, and pipe fitting that lay above a heap of ore. It is preferred that the filter pipe fitting is constructed of composite plastic material such as polypropylene and glass. It is also preferred that the supply pipe is constructed of polyvinylchloride or polyethylene, and that the drip line be made of polyethylene. However, the materials and filter pipe fitting dimensions may be determined by those skilled in the art.

DETAILED DESCRIPTION OF THE INVENTION

Figure 1:
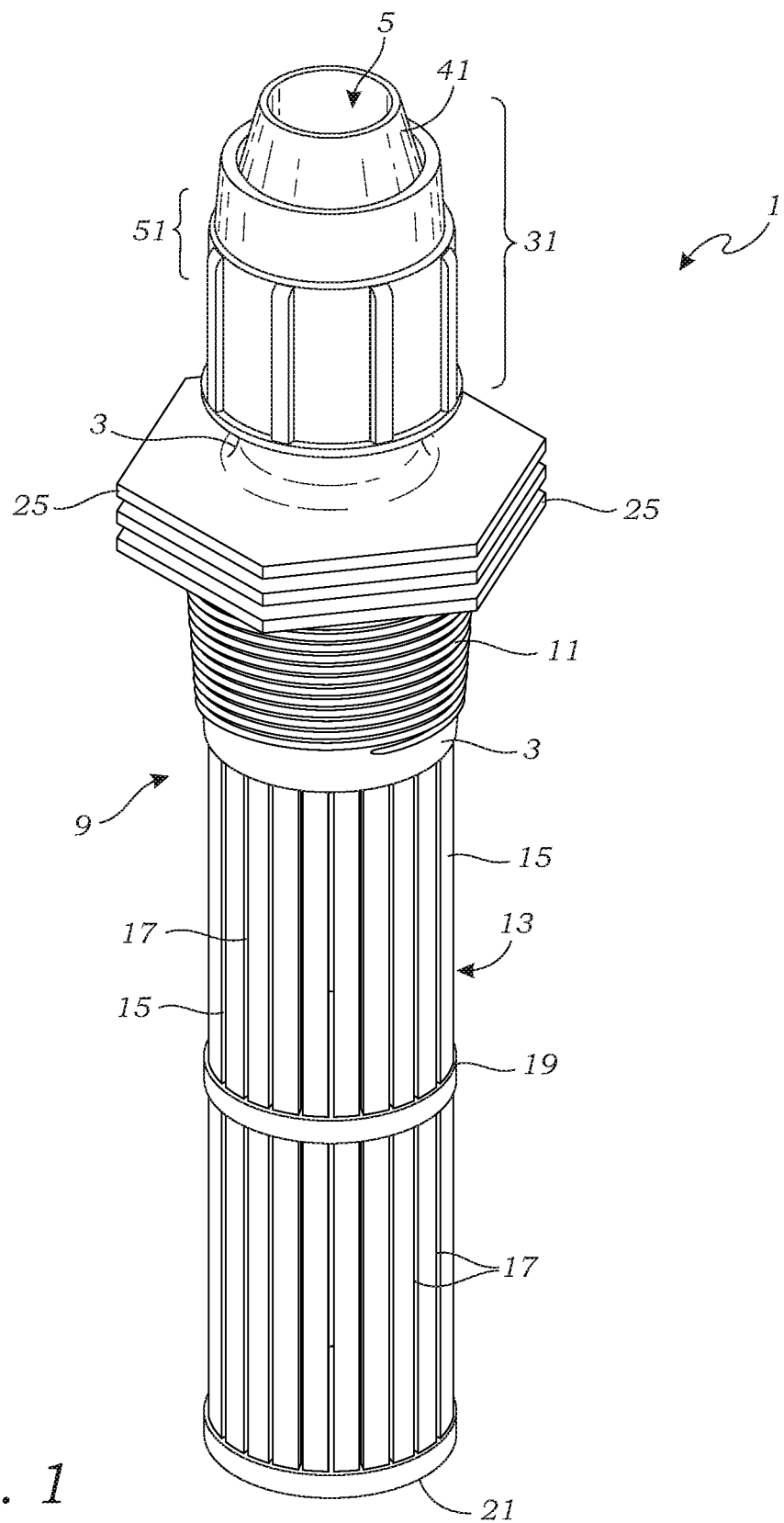
FIG. 1 is a top perspective view of the filter pipe fitting of the present invention.
Figure 2:
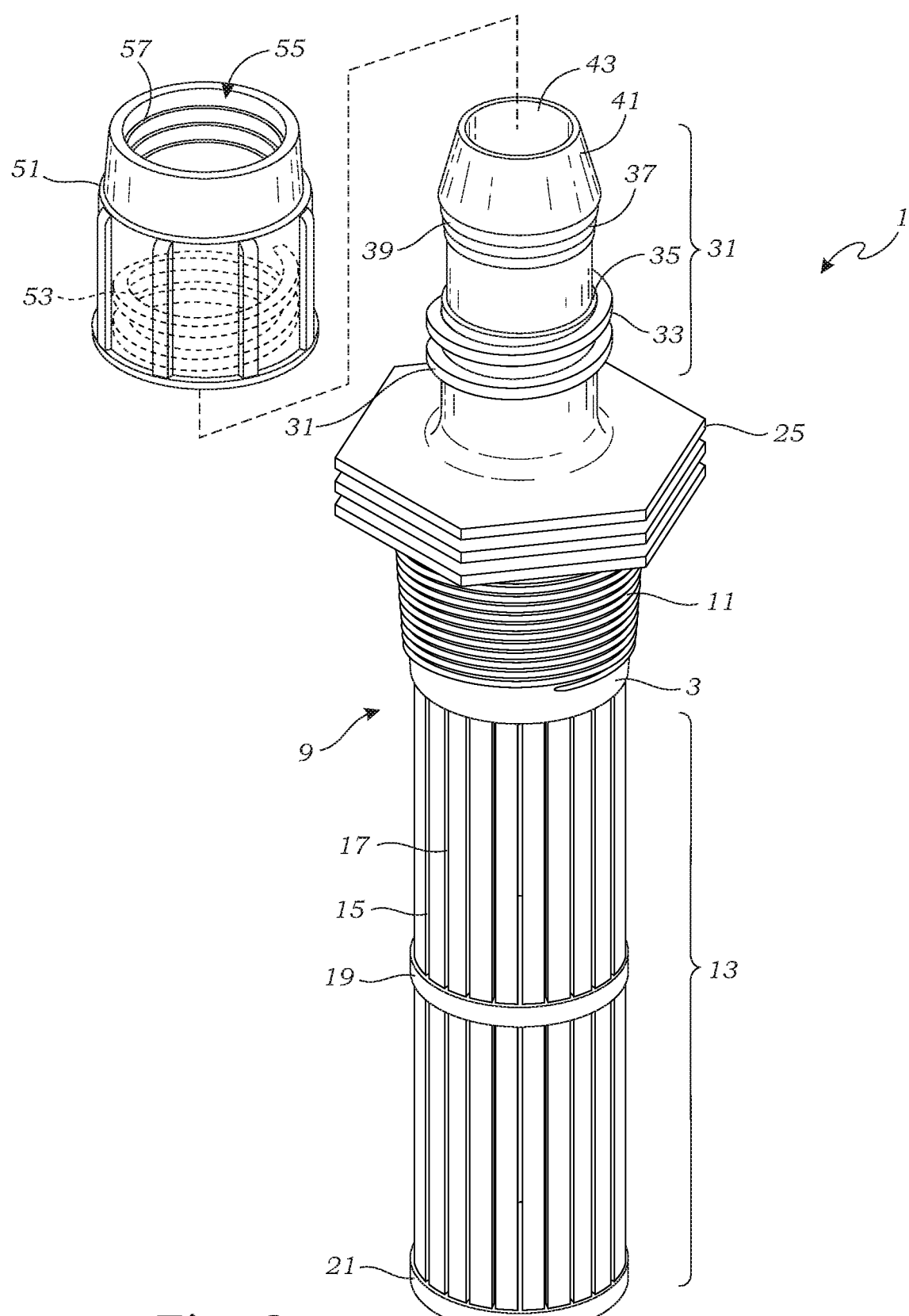
FIG. 2 is an exploded top perspective view of the filter pipe fitting.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-7, the pipe fitting 1 has a tubular body 3 including a cylindrical sidewall, a central bore 5, and first and second ends 9 and 31. The tubular body's first end 9 includes a construction for connecting to a supply pipe 65. Meanwhile, the tubular body's second end 31 includes a construction for connecting to a length of drip line tubing 81.

The pipe fitting's first end 9 includes male threads 11 formed on the exterior of the tubular body 3 for threadably engaging female threads 71 formed in a hole 69 which extends through the supply pipe's sidewall 67. The male and female threads may be of any type as can be determined by those skilled in the art. However, in a preferred embodiment, the threads have a tapered construction in accordance with American National Standard Taper Pipe Thread ("NPT") having a taper of 0.75 inch per foot.

The pipe fitting's first end 9 further includes a filter element, also referred to as a screen 13. The filter element 13 may be constructed in various shapes including conical or cylindrical. However, in the preferred embodiment illustrated in the Figures, the filter element 13 has a cylindrical shape wherein the cylinder's central axis is coincident with the tubular body's central bore. Further, the filter element's cylindrical shape has a length "L", and a width "W" perpendicular to the filter element's length. (See FIG. 5). For the preferred embodiment illustrated in the Figures, the filter element has a cylindrical shape, and thus the filter element's width is the same as its diameter. However, since the filter element 13 may have a shape other than cylindrical, such as conical or even cubic, the term "width" is used herein. A preferred filter element 13 has a length of 1 inch-12 inches and a width of ¼ inch-3 inches, which will depend on the inner diameter of the supply pipe 65.

Figure 5:
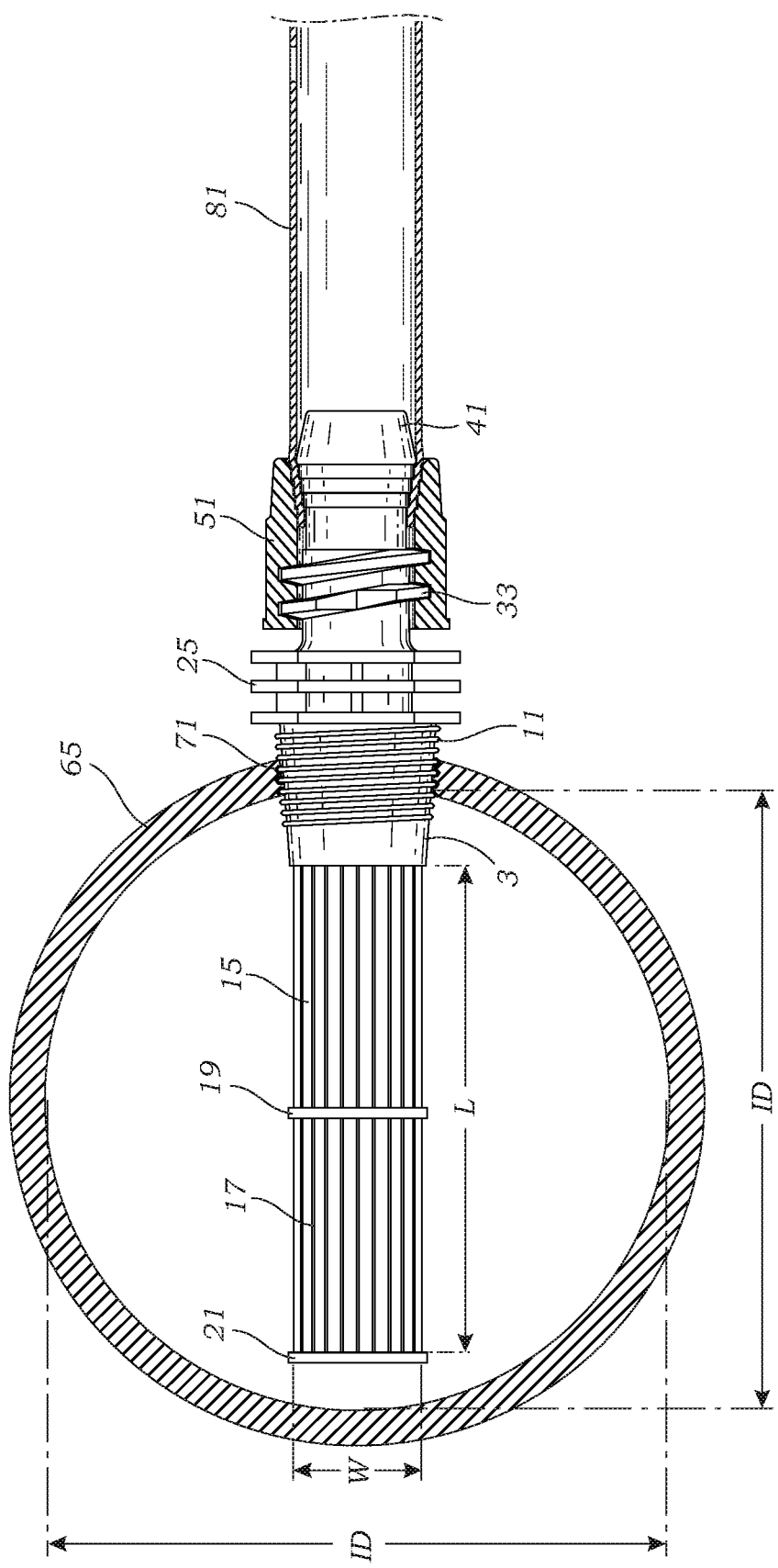
FIG. 5 is a side-cutaway view of the filter pipe fitting affixed to both a supply pipe and drip line tubing.

With reference to FIG. 5, preferably the filter element's length is greater than or equal to the filter element's width. More preferably, the filter element's length is at least twice as great as the filter element's width. Even more preferably, the filter element's length is at least four times as great as the filter element's width. In the preferred embodiment illustrated in the Figures, the filter element 13 includes a plurality of longitudinally extending slats 15 which form longitudinally extending slots 17. Preferably, the filter element's distal end is closed by an end wall 21. The end wall 21 may be formed integrally with the filter element slats so as to not be disengageable from the slats 15. However, in a preferred embodiment, the end wall 21 can be disengaged from the distal end of the slats 15 by providing a snap-fit or press-fit connection between the two. As illustrated in the Figures, the filter 13 may also include one or more reinforcing rings 19 to provide proper spacing between the slats 15, and thus uniform width of the slots 17. As illustrated in the Figures, a preferred pipe fitting 1 includes a single reinforcing ring 19 which is located at the mid-point between the ends of the filter element 13.

Meanwhile, the second end 31 of the pipe fitting 1 includes a pipe fitting element for connecting to deformable tubing in accordance with U.S. Pat. No. 6,695,355 which is incorporated by reference in its entirety herein. Accordingly, the pipe fitting's second end 31 includes male threads 33 which extend helically around the exterior of the pipe fitting's tubular body 3. Preferably, the tubular body includes a circular shoulder, located at the distal end of the male threads 33, which is intended as a stopper for engagement with the end of the drip line tubing 81. The fitting's second end 31 further includes a male clamping surface 37 and a tapered end 41. The male clamping surface 37 includes a plurality of circular steps 39 which increase circumferentially towards the distal end of the pipe fitting's second end. At the distal end of the male clamping surface 37, the pipe fitting's second end 31 has a tapered end 41 which narrows diametrically and circumferentially so as to facilitate insertion into the drip line tubing's interior.

For locking a drip line tubing 81 to the pipe fitting's second end 31, the pipe fitting 1 includes a ring nut 51. The ring nut 51 includes female threads 51 sized and positioned to threadably engage the second end's male threads 33. In addition, the ring nut 51 includes a flared opening 55 including a plurality of circular female steps 57 which expand diametrically and circumferentially toward the distal end of the ring nut 51.

Between the pipe fitting's first end 9 and second end 31, preferably the pipe fitting 1 includes end-of-stroke flanges 25 which impede relative rotation between the pipe fitting 1 and the supply pipe 65 when affixed together, while also impeding relative rotation of the ring nut 51 and the pipe fitting's tubular body 3 prior to the pipe fitting engaging the drip line tubing 81. The pipe fitting may further include axial stiffening ribs 27 between the flanges 25 to provide structural stiffness for the overall filter pipe fitting 1.

As best illustrated in FIG. 5, the filter pipe fitting 1 is affixed to a supply pipe 65 by threadably inserting the pipe fitting's male threads 11 into the supply pipe's female threads 71. Preferably, the filter pipe fitting 1 is torqued relative to the supply pipe 65 until the tapered threads form a fluid-tight seal. As illustrated in FIG. 5, this arrangement positions the pipe fitting's filter 13, with its slats 15 and slots 17, within the interior of the supply pipe 65. Preferably, the pipe fitting's filter element 13 has a length "L" of at least one-quarter (¼) of the supply pipe's inner diameter "ID". For example, a supply pipe 65 having an inner diameter of 4 inches would connect to a pipe fitting 1 having a filter element with a length of at least 1 inch. More preferably, the pipe fitting's filter element 13 has a length "L" of at least one-half (½) of the supply pipe's inner diameter "ID". For this example, a supply pipe 65 having an inner diameter of 4 inches would connect to a pipe fitting 1 having a filter element 13 with a length of at least 2 inches. Even more preferably, and as illustrated in FIG. 5, the pipe fitting's filter element 13 has a length "L" of at least three-quarters (¾) of the supply pipe's inner diameter "ID". For this example, a supply pipe 65 having an inner diameter of 4 inches would connect to a pipe fitting 1 having a filter element 23 with a length of at least 3 inches. Also preferable, and as illustrated in FIG. 5, the supply pipe 65 and pipe fitting 1 are constructed to position the filter element's midpoint at approximately the center of the supply pipe 65.

Figure 3:
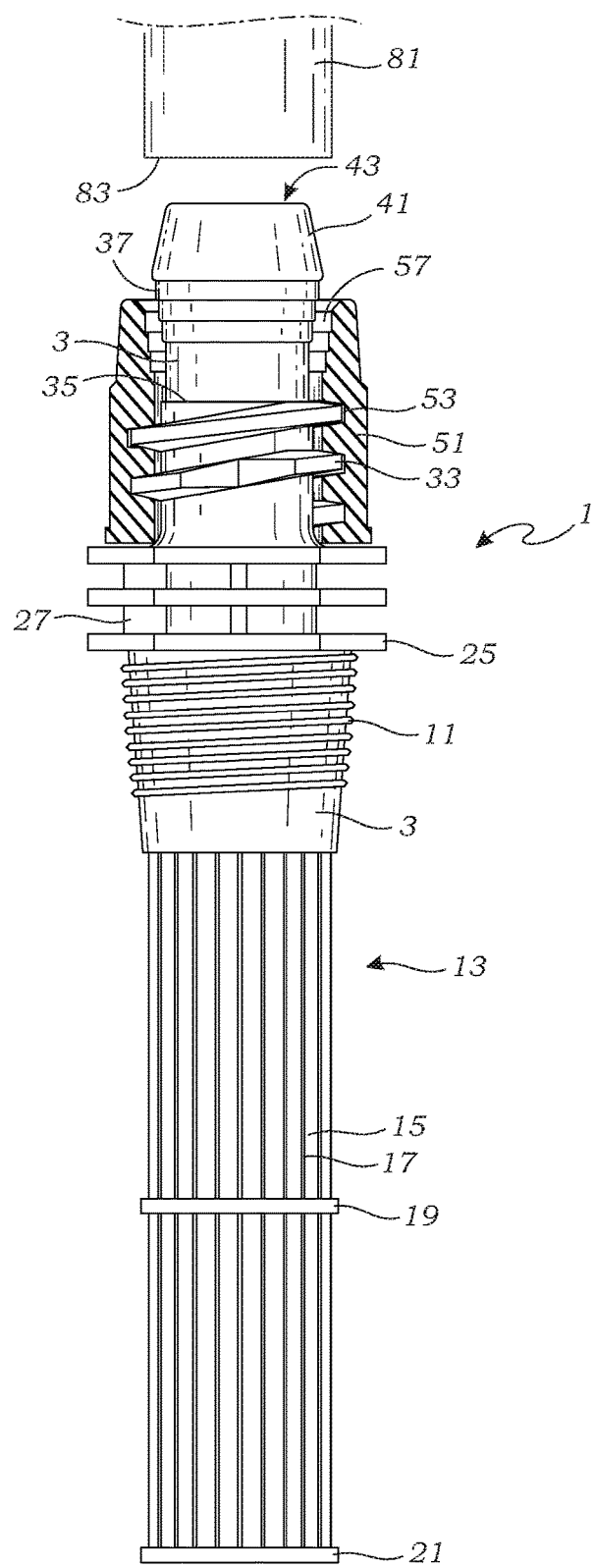
FIG. 3 is a side-cutaway view of the filter pipe fitting about to be attached to drip line tubing.
Figure 4:
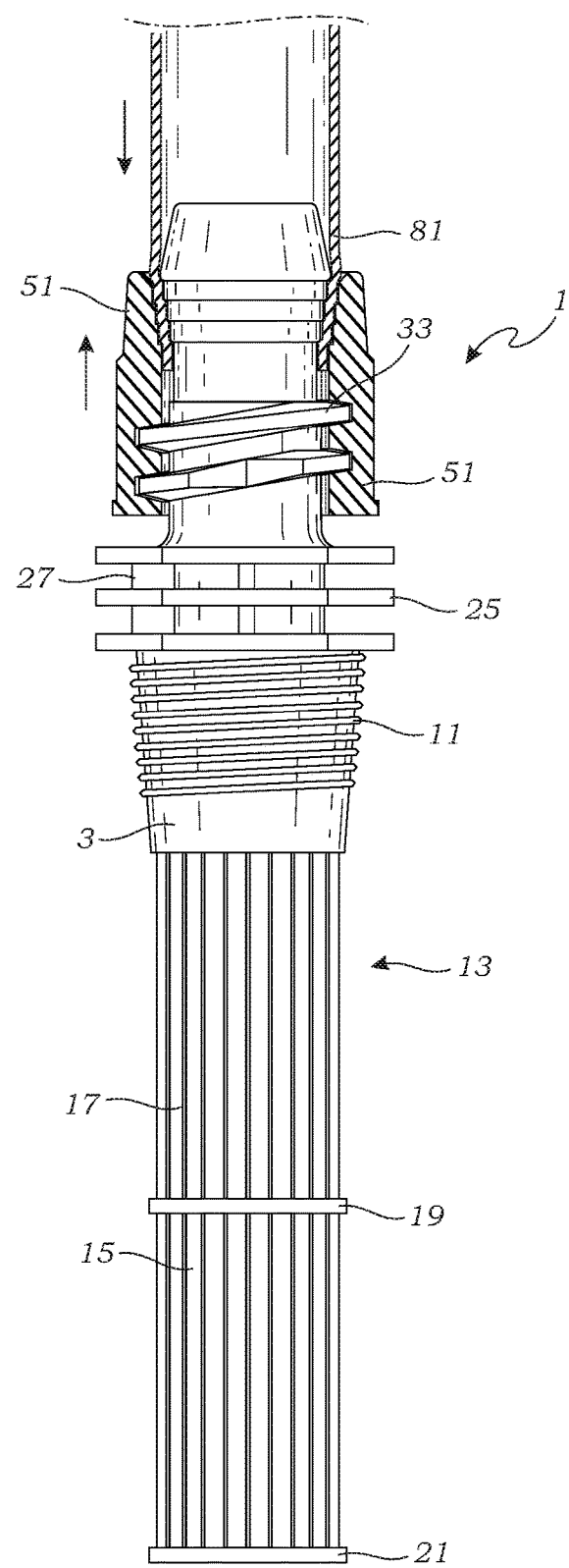
FIG. 4 is a side-cutaway view of the filter pipe fitting after having been affixed to drip line tubing.

As illustrated in FIGS. 3-5, the drip line tubing 81 is affixed to the pipe fitting's second end 31 by first rotating the ring nut 51 until it engages a flange 25. This creates a space between the male clamping surface 37 and the female clamping surface 57. The drip line tubing's tubular end 83 is then forced over the pipe fitting's tapered end 41 until the drip line tubing engages the pipe fitting's circumferential shoulder 35. Thereafter, the ring nut 51 is backed off from the flange 25 by rotating the ring nut 51 so as to move the ring nut away from the flanges 25 until the male and female clamping surfaces 37 and 57 have clamped onto the end 83 of the drip line tubing 81.

Figure 6:
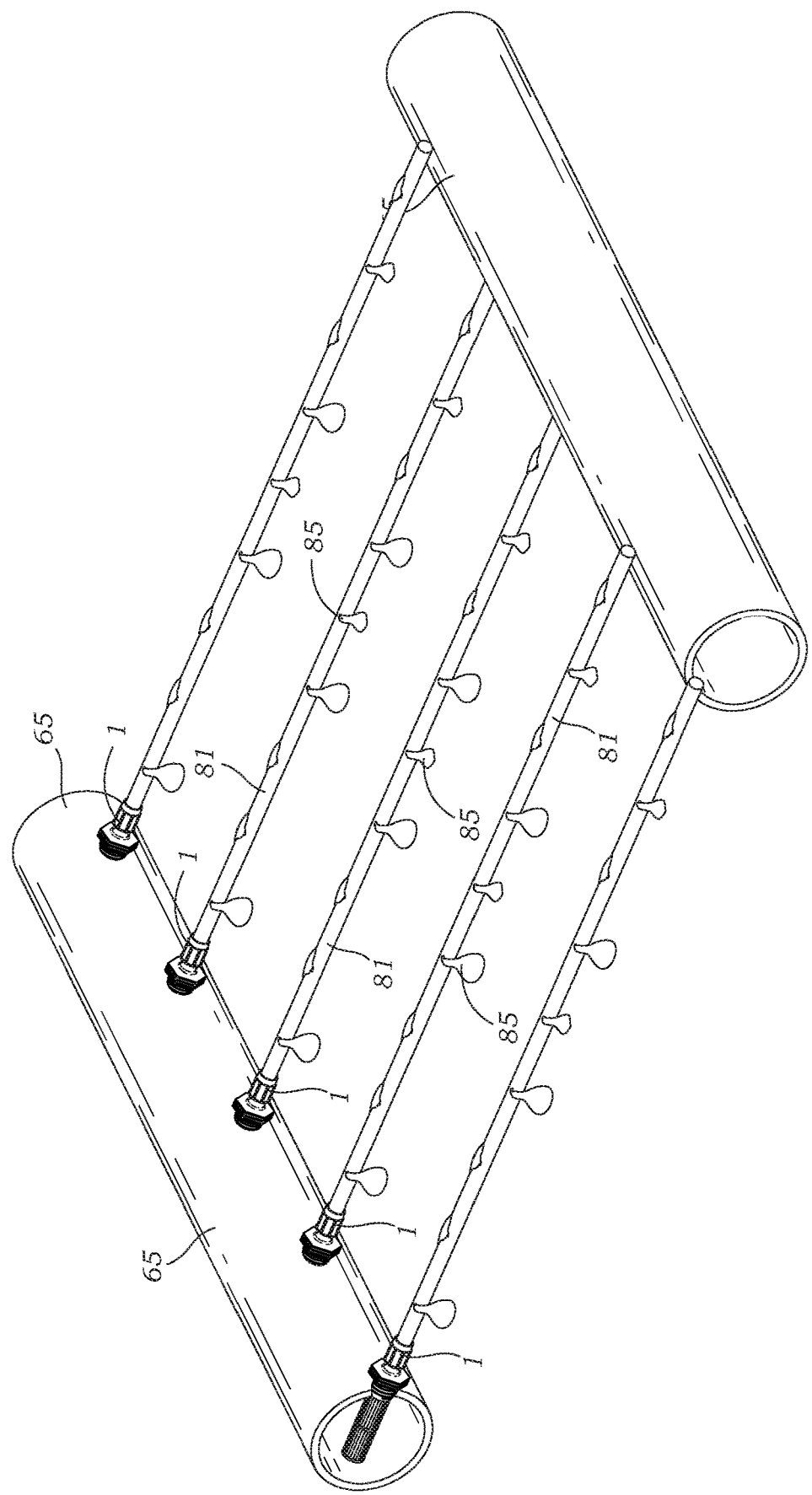
FIG. 6 is a top perspective view illustrating an assembly including a supply pipe, drip line tubing and filter pipe fittings.
Figure 7:
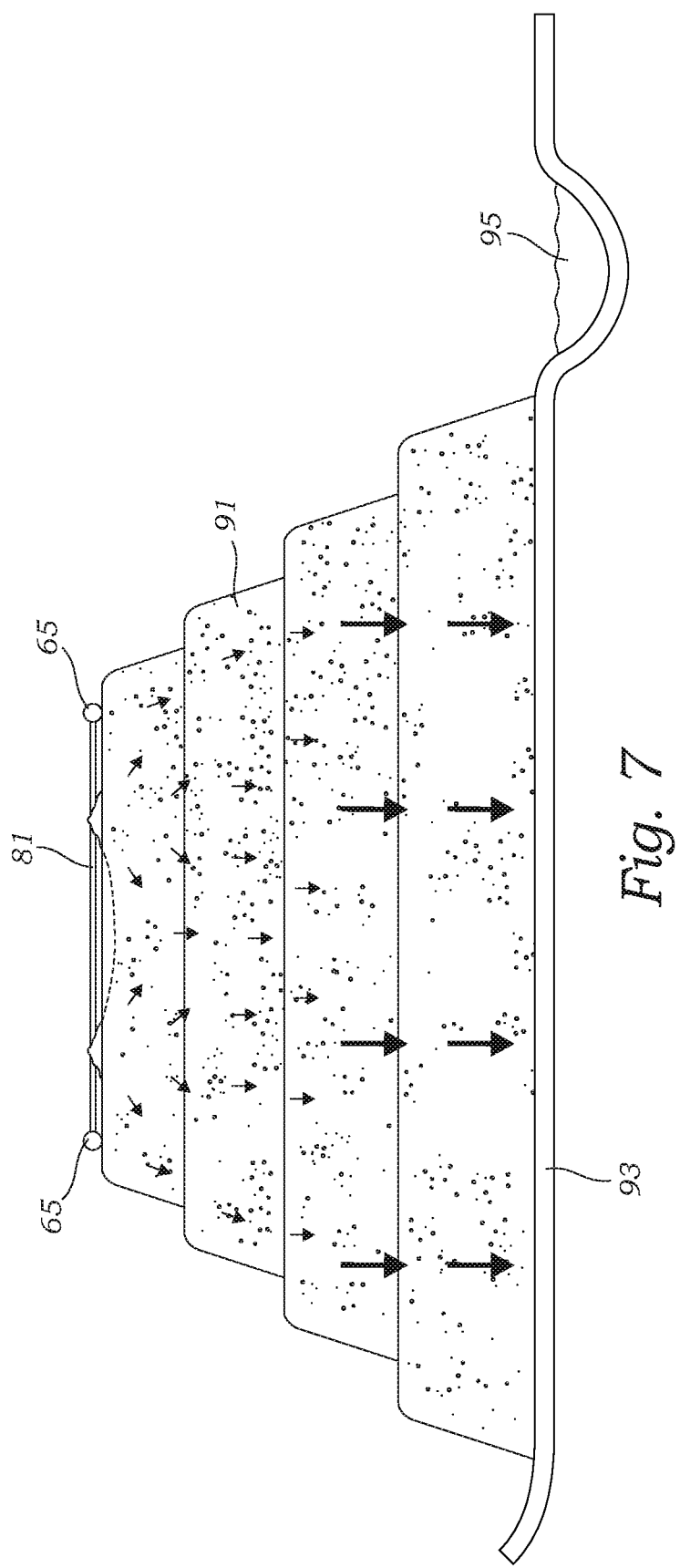
FIG. 7 is a side perspective view illustrating a heap leach mining construction employing drip irrigation and a solution collection pad.

As illustrated in FIGS. 6 and 7, the entire assembly including supply pipe 65, drip lines 81 and pipe fitting 1 are laid out over a heap of ore 91. Leaching solution is transported by the supply pipe 65 through the filter's slots 17 into pipe fitting 1, which in turn supplies the leaching solution the drip lines 81. The drip lines 81 include holes 85 allowing the leaching solution to drip onto the heap of ore 91. The leaching solution travels through the ore to release the precious metals which are collected by the pad 93 and collection pond 95.

While several particular forms of the invention have been illustrated and described, it will be apparent that various modifications can be made without departing from the spirit and scope of the invention. For example, it is preferred that the filer pipe fitting 1 be made of a composite plastic material such as polypropylene and glass, that the supple pipe 65 be made of polyvinylchloride or polyethylene, and that the drip line tubing 81 be made of polyethylene. However, any of these elements may be made of other materials as can be determined by those skilled in the art. Furthermore, the filter pipe fitting 1 may have various dimensions as would be suitable for connecting a supply pipe to a drip line tubing which can have carious dimensions as can be determined by those skilled in the art. Therefore, it is not intended that the invention be limited except by the following claims. Having described the invention in such terms to enable those skilled in the art to make and use it, and having identified the presently best mode of practicing it,

What is claimed is:

1. A filter pipe fitting and supply pipe assembly comprising:
   a supply pipe which transports fluid in a direction defining a fluid flow path, said supply pipe having a cylindrical sidewall and an inner diameter ("ID"), said sidewall including a hole;
   a length of tubing;
   a pipe fitting connecting said supply pipe to said length of tubing, said pipe fitting including a tubular body and a filter element;
   said tubular body having a first end which extends through said supply pipe's hole, a second end connected to said tubing, and a central bore extending from said supply pipe to said tubing, said central bore defining said tubular body's longitudinal axis; and
   said filter element including an open end affixed to tubular body's first end so as to be in fluid communication with said tubular body's central bore, said filter element also including an end wall and a sidewall coaxially positioned relative to said longitudinal axis, said sidewall extending, said sidewall extending perpendicular to supply pipe so as to extend across said fluid flow path, said sidewall including a plurality of openings which allow the passage of fluids from said supply pipe into said tubular body, said filter element having a length coincident with said longitudinal axis which is at least one-quarter (¼) of the supply pipe's inner diameter "ID", and wherein said filter element is cylindrical and said filter element's midpoint is at the center of said supply pipe.

2. A filter pipe fitting and supply pipe assembly of claim 1 wherein said filter element is cylindrical and has a length at least one-half (½) of the supply pipe's inner diameter "ID".

3. A filter pipe fitting and supply pipe assembly of claim 1 wherein said filter element is cylindrical and has length at least one-half (½) of the supply pipe's inner diameter "ID", and said filter element's length is at least twice said filter element's width.

4. A filter pipe fitting and supply pipe assembly of claim 1 wherein said filter element is cylindrical and has a length at least three-quarters (¾) of the supply pipe's inner diameter "ID".

5. A filter pipe fitting and supply pipe assembly of claim 1 wherein said filter element is cylindrical and has length at least three-quarters (¾) of the supply pipe's inner diameter "ID", and said filter element's length is at least four times said filter element's width.

6. The filter pipe fitting of claim 1 wherein the tubular body's first end includes a male thread and said supply pipe's hole includes a female thread, and said male and female threads are constructed in a tapered fashion.

\* \* \* \* \*